(No Model.)

T. J. CRUMP.
Sawing Machine.

No. 240,667.  Patented April 26, 1881.

Witnesses
Wm. W. Mortimer.
A. C. Kiskadden.

Inventor
T. J. Crump,
per
F. A. Lehmann,
Atty.

UNITED STATES PATENT OFFICE.

THOMAS J. CRUMP, OF BUENA VISTA, ASSIGNOR OF ONE-HALF TO DAVID T. POUNDS, OF NACOGDOCHES COUNTY, TEXAS.

SAWING-MACHINE.

SPECIFICATION forming part of Letters Patent No. 240,667, dated April 26, 1881.

Application filed December 3, 1880. (No model.)

*To all whom it may concern:*

Be it known that I, THOMAS JEFFERSON CRUMP, of Buena Vista, in the county of Shelby and State of Texas, have invented a new and valuable Improvement in Drag-Saws; and I do hereby declare that the following is a full, clear, and exact description of the construction and operation of the same, reference being had to the annexed drawings, making a part of this specification, and to the letters and figures of reference marked thereon.

My invention relates to an improvement in sawing-machines; and it consists in the combination of a drag-saw, an operating-lever, and a wheelbarrow or truck, the wheelbarrow being made to support the saw and move it around from place to place, as will be more fully described hereinafter.

The object of my invention is to provide an easy and ready means of transporting the saw from place to place, and to so connect it to the wheelbarrow or truck which supports it that they can be readily separated, so that the wheelbarrow or truck can be used by itself whenever it is so desired.

Figure 1:
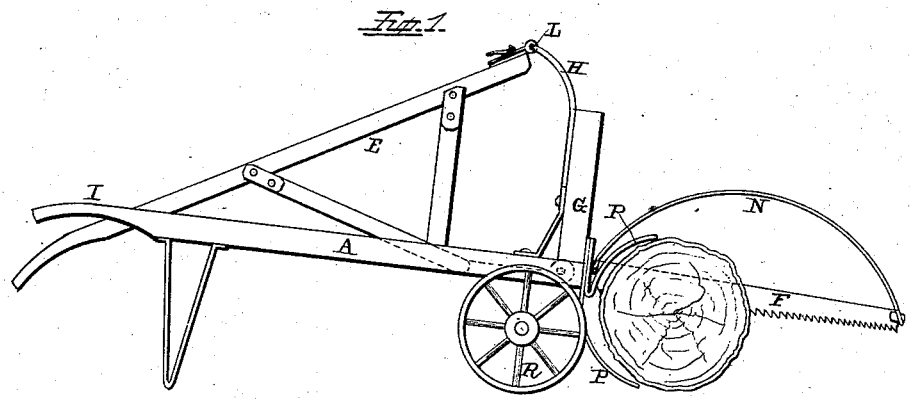
Figure 2:
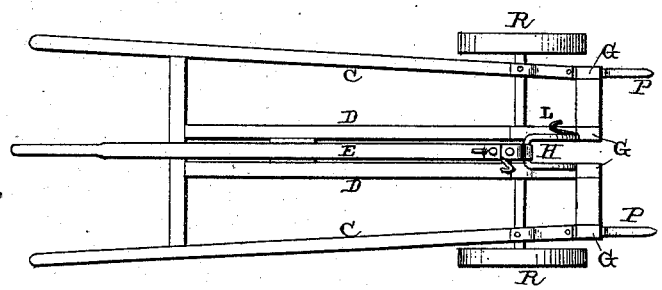
Figure 3:
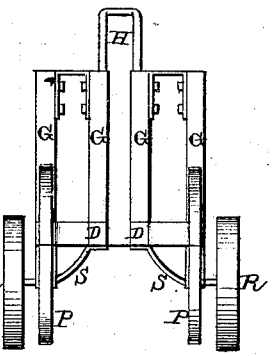

Figure 1 is a side elevation of a machine embodying my invention. Fig. 2 is a plan view of the wheelbarrow alone. Fig. 3 is an end view of the wheelbarrow.

A represents a wheelbarrow or truck, and upon which the saw is mounted while in operation and while being moved about from place to place. The body of this wheelbarrow consists of four nearly parallel beams, C D, the two central ones of which are placed close together and serve as guides for the lever E, by means of which the saw F is operated.

Upon the end of each beam, next to the saw, is secured a suitable standard, G, which rise upward to any suitable distance, and which are braced together in pairs, as shown. These standards form both the rear end of the wheelbarrow or truck, and the two central ones have a curved support, H, secured to them. This support is curved forward at its upper end toward the handles I, and to it is fastened, in any suitable manner, the lever for operating the saw. Secured to the upper end of this lever, which is made triangular in shape, as shown in Fig. 1, so as to have a more direct action upon the saw, is the hook L, which catches in the bow N, which is attached to the top of the saw, and which serves to hold the saw in an upright position when not in use and while being transported from place to place. This bow N also serves as a brace for the saw, so as to prevent it from bending or doubling up, and when applied to thin and long saws makes them as rigid and serviceable as shorter and heavier ones.

Secured to the end of the wheelbarrow or truck which is next to the log that is being sawed are suitable hooks or catches P, which serve to catch in or against the side of the log and hold the truck steady in position while the saw is in operation. These hooks and the support are, preferably, only clamped loosely in place, so that should it be desired to use the wheelbarrow or truck alone, they can be removed, and then, by putting a floor and back upon the wheelbarrow or truck, it can be used for the ordinary purposes.

The wheels R are journaled in suitable boxes which extend any suitable distance below the lower edges of the outside beams, and then the boxes are braced in position upon their inner sides by means of the braces S, which are secured to the two central parallel beams, D.

The saw is secured to the rear end of the operating-lever, and while the saw is in use the operator has but to work the lever up and down and the saw will be made to reciprocate back and forth upon the log. After the log has been sawed in two, or when it is desired to remove the saw from place to place, it is only necessary to raise the saw in a vertical position, so that the hook or hooks can be made to catch in it and hold it in a vertical position.

By thus attaching the saw to a truck or other similar device provided with wheels, the saw can be changed from place on the log as fast as a cut is made with much greater ease than the log can be adjusted in front of the saw.

Having thus described my invention, I claim—

In a drag-saw, the combination of a wheelbarrow having upon its rear end the uprights G, with a space between them for the operating-lever E to work through, the support H, upon which the lever is hung, and the saw F, the parts being arranged for operation substantially as shown.

In testimony that I claim the above I have hereunto subscribed my name in the presence of two witnesses.

THOMAS JEFFERSON CRUMP.

Witnesses:
F. A. LEHMANN,
WILL. H. KERN.